United States Patent
Cartwright

[15] 3,685,050

[45] Aug. 15, 1972

[54] SINGLE ANTENNA SIGNAL RETRANSMISSION DEVICE

[72] Inventor: Victor F. Cartwright, Fullerton, Calif.

[73] Assignee: Cartwright Engineering, Inc., Fullerton, Calif.

[22] Filed: April 13, 1970

[21] Appl. No.: 27,538

[52] U.S. Cl..............343/18 B, 343/6.8 R, 343/18 D
[51] Int. Cl.......................................G01s 9/02
[58] Field of Search..................343/6.8 R, 6.8 LC, 343/18 B, 18 C, 18 D, 18 E

[56] References Cited

UNITED STATES PATENTS

| | | | |
|---|---|---|---|
| 2,943,318 | 6/1960 | Deloraine et al.........343/6.8 R |
| 2,703,881 | 3/1955 | Begemann et al........343/18 E |
| 3,039,089 | 6/1962 | McMurtrey, Jr.........343/6.8 R |
| 2,412,991 | 12/1946 | Labin...........................325/25 |

Primary Examiner—Malcolm F. Hubler
Attorney—Hinderstein & Silber

[57] ABSTRACT

A device for receiving a signal via an antenna and for retransmitting via the same antenna an augmented signal of identical frequency and coherent phase. A circulator connected to the antenna directs the received signal to a diode switch and thence to a broadband RF amplifier. The switch periodically, alternately isolates and passes the received signal to the amplifier in response to a square wave control signal having a frequency considerably lower than that of the received signal. The sampled, amplified signal is delayed by a time duration substantially equal to one-half the period of the control signal, and then supplied via the circulator to the antenna. The device is useful as an augmentation amplifier, and for enhancing radar target reflectivity.

14 Claims, 6 Drawing Figures

PATENTED AUG 15 1972          3,685,050

SQUARE WAVE
CONTROL SIGNAL

RF INPUT
SIGNAL

INPUT TO RF
AMPLIFIER 24

INPUT TO
DELAY LINE 28

OUTPUT OF
DELAY LINE 28

TIME →

INVENTOR.
VICTOR F. CARTWRIGHT

BY

Henderson & Silber

ATTORNEYS

SINGLE ANTENNA SIGNAL RETRANSMISSION DEVICE

BACKGROUND OF THE INVENTION

1. Field of the Invention

The present invention relates to a single antenna signal retransmission device, and more particularly to an augmentation amplifier which transmits via an antenna an amplified signal coherent in phase and identical in frequency with a signal received on the same antenna.

2. Description of the Prior Art.

For certain applications, it is advantageous to enhance or augment the radar signal returned by a target. For example, if the target is of small physical size or fabricated of a material which exhibits poor radio reflectivity, presence of the target may not be detected since the radar echo is of insufficient amplitude to be picked up by the radar receiver. By providing an active device on the target to augment the radar reflectivity thereof, the target can be detected at greater range than otherwise possible.

In the past, various equipments have been implemented for augmenting target reflectivity. Perhaps best known of these is a "radar beacon" which includes a receiver, a modulator and a transmitter. The received radar pulse is delayed by the beacon for a time equivalent to the pulse duration, and then retransmitted at the same frequency but with greater amplitude. While reception and transmission frequencies are identical, the received and transmitted signals are not phase coherent. Moreover, the delay encountered in the beacon introduces a significant range error in the system. This range error $R = tc/2$, where $t$ is the delay time (equivalent to the pulse duration), and $c$ is the velocity of light. This corresponds to approximately 0.002 $\mu$sec/foot of distance. For example, if the retransmitted pulse is delayed by 2$\mu$sec, the range error due to transit time through the beacon is about 1,000 feet.

In other existing radar beacons, the beacon transit time error is eliminated by simultaneously receiving on a first carrier frequency $f_1$ and transmitting on a different carrier frequency $f_2$. This condition does not simulate a reflected radar signal, and requires the radar receiver to be returned to frequency $f_2$. Of course, there is no phase coherency between the input and output RF energy.

Another known technique for achieving electronic enhancement of a radar signal is to utilize an RF amplifier connected between widely separated receiving and transmitting antennas. If the isolation between the two antennas is greater than the amplifier gain, the system can receive on frequency $f_1$ and retransmit on the same frequency $f_1$ simultaneously and with phase coherency. However, it is extremely difficult to achieve overlapping antenna patterns for the receive and transmit antennas, while maintaining the isolation requisite for system operation. These requirements make it virtually impossible to install such a system on a physically small target.

The various shortcomings of the prior art are overcome using the inventive signal retransmission device which facilitates radar signal augmentation utilizing a single antenna for both reception and transmission. The received and transmitted signals have the same frequency and are of coherent phase. Transit time through the augmentation device is very short, so that insignificant range error is introduced by the system. If desired, the retransmitted signal may be pulse code modulated.

SUMMARY OF THE INVENTION

In accordance with the present invention, there is provided apparatus for electronic augmentation of a radar signal. The apparatus utilizes a single antenna and provides a transmitted signal identical in frequency and coherent in phase with the received signal.

In a preferred embodiment, the augmentation device comprises a single antenna connected via a circulator and a diode switch to the input of an RF amplifier. The diode switch operates in response to a square wave control signal to sample a received signal. That is, the switch periodically, alternately isolates and passes the received signal to the input of the RF amplifier. The frequency $f_s$ of the control signal typically is considerably lower than the frequency of the received RF signal.

The sampled signal is amplified by the RF amplifier and supplied via a delay line to the circulator for retransmission by the same antenna. Preferably, the delay line introduces a time delay equal to one-half the period of the control signal of frequency $f_s$. As a result, the transmitted signal increments alternate in time with the received signal increments or samples passed to the RF amplifier.

Thus it is an object of the present invention to provide an improved signal augmentation device.

Another object of the present invention is to provide a signal retransmission system utilizing a single antenna.

It is another object of the present invention to provide a signal retransmission device utilizing the same antenna for reception and transmission and wherein the enhanced, transmitted signal is of identical frequency and in phase coherence with the received signal.

Still another object of the present invention is to provide an augmentation device including a single antenna, means for sampling and amplifying the received signal and means for delaying and retransmitting the amplified sampled signal.

Yet another object of the present invention is to provide a signal augmentation device including an antenna, a circulator, a diode switch for periodically, alternately isolating and passing a received signal to the input of an RF amplifier, and a delay line connecting the output of the RF amplifier to the same circulator and antenna, the delay line providing a delay related to the periodicity of the switch.

BRIEF DESCRIPTION OF THE DRAWINGS

Still other objects, features, and attendant advantages of the present invention will become apparent to those skilled in the art from a reading of the following detailed description of the preferred embodiment constructed in accordance therewith taken in conjunction with the accompanying drawings wherein like numerals designate like parts in the several figures and wherein.

DESCRIPTION OF THE PREFERRED EMBODIMENT

Figure 1:
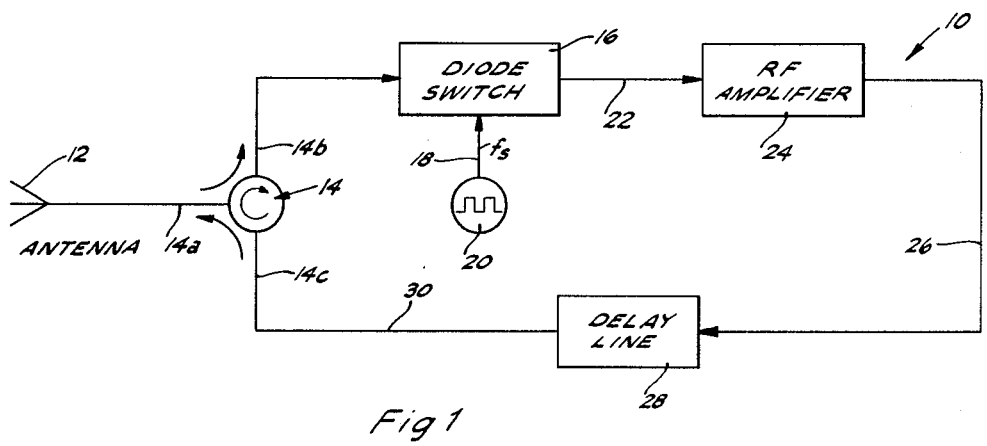
FIG. 1 is an electrical block diagram of a single antenna signal retransmission device in accordance with the present invention.

Referring now to the drawings, and particularly to FIG. 1 thereof, there is shown a signal transmission device 10 in accordance with the present invention. Device 10 operates in conjunction with a single antenna 12 which is connected to the common terminal 14a of a conventional circulator 14. Device 10 functions to transmit via antenna 12 a signal greater in amplitude, identical in frequency and coherent in phase with a signal received on the same antenna 12.

Still referring to FIG. 1, the output port 14b of circulator 14 is connected to the input of a diode switch 16. Switch 16 also receives via a line 18 a control signal of frequency $f_s$ supplied from a source 20. As described in detail below, diode switch 16 functions to sample a received signal and to supply this sampled signal via a line 22 to the input of an RF amplifier 24. The output of RF amplifier 24 is supplied via a line 26 to a delay line 28 or like delay device. The output of delay line 28 is supplied via a line 30 to the input port 14c of circulator 14.

Figure 2A:
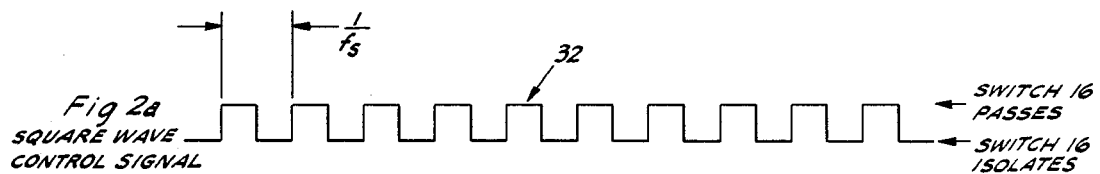
FIGS. 2a through 2e are waveforms illustrating operation of the device of FIG. 1.

The control signal supplied by source 20 may comprise a square wave such as that designated 32 and illustrated in FIG. 2a. Preferably the frequency $f_s$ of control signal 32 is considerably lower than the frequency of a received signal. Very satisfactory system operation is achieved if the frequency of the receiving signal is at least 50 times the frequency $f_s$ of the control signal supplied on line 18. By way of example only, if the device 10 is designated for operation in the "L" band, the received signal may lie within the frequency range of from 1,200 MHz to 1,400 MHz, and control signal 32 may have a frequency $f_s$ = 20 MHz.

Figure 2B:
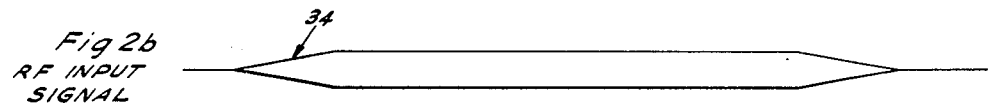

If device 10 is to be used for retransmission of pulsed signals, such as the RF input signal 34 illustrated by the modulation envelope of FIG. 2b, the period $1/f_s$ of control signal 32 preferably should be somewhat shorter than the duration of the received RF pulse. For example, a received radar pulse may have a duration of from 1 $\mu$sec to 10 $\mu$sec. If $f_s$ = 20 MHz, the period $1/f_s$ of signal 32 is 0.05 $\mu$sec and the input signal will be sampled 20 times per $\mu$sec of received signal pulse duration.

Figure 2C:
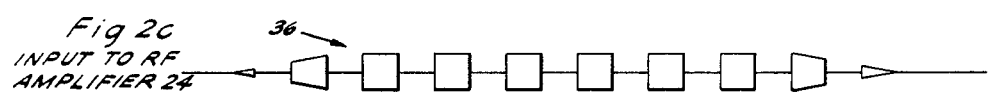

Referring again to FIG. 1, diode switch 16 functions under control of the signal on line 18 alternately to isolate and to pass a received signal from circulator port 14b to the input of RF amplifier 24. As illustrated by FIGS. 2a, 2b and 2c, diode switch 16 passes RF input signal 34 when control signal 32 is true. Alternately, when control signal 32 is false, diode switch 16 functions to isolate circulator output port 14b from RF amplifier 24. That is, when control signal 32 is false, the RF input signal 34 is not passed to RF amplifier 24. Accordingly, the sampled signal on line 22 typically will have the appearance of waveform envelope 36 of FIG. 2c. Although the preferred sample time is one-half the period of the control signal on line 18, as illustrated in FIGS. 2a and 2c, the invention is not so limited, and other duty cycles may be employed.

Figure 2D:
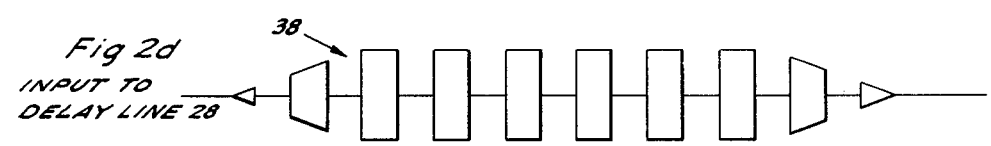

The sampled signal 36 on line 22 is amplified by RF amplifier 24 to provide on line 26 a signal having the typical wave shape envelope 38 illustrated in FIG. 2d. RF amplifier 24 may be of the type providing an output signal which is coherent in phase with the input signal provided thereto. Further, amplifier 24 may be broadband. Thus, for "L" band operation, RF amplifier 24 may be capable of amplifying any signal within the range of from 1,200 MHz through 1,400 MHz without tuning or adjustment. Such amplifiers are available commercially. Of course, the present invention is by no means limited to operation in this exemplary frequency range.

Delay line 28 preferably exhibits a delay equal to the time duration of the sampled signal increments supplied to RF amplifier 24. Thus, in the embodiment described hereinabove wherein switch 16 passes signal 34 for one-half of the period $1/f_s$ of control signal 32, delay line 28 preferably exhibits a delay time of $\frac{1}{2}f_s$. In such an embodiment, if control signal 32 has a frequency of $f_s$ = 20 MHz, delay line 28 may exhibit a delay of $\frac{1}{2}f_s$ = 0.025 $\mu$sec. Such a delay readily can be implemented by a coaxial cable of appropriate length.

Figure 2E:
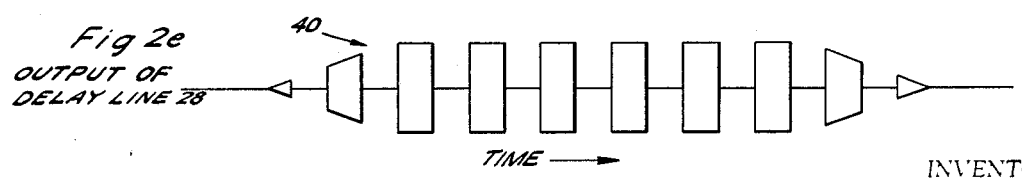

The output signal from delay line 28 typically will have the appearance illustrated by wave form envelope 40 of FIG. 2e. Note that signal 40 is identical in envelope shape, frequency and phase with signal 38 from RF amplifier 24, but is delayed in time by one-half the sample period thereof. The signal on line 30 is supplied via circulator input port 14c and common port 14a for transmission by antenna 12.

As a result of the delay provided by delay line 28, the transmitted signal increments 40 occur during the time that diode switch 16c isolates circulator port 14b from RF amplifier 24. Accordingly, signal retransmission device 10 effectively alternately receives a signal and retransmits an augmented signal via the same antenna 12. Oscillation is prevented by such time sharing in device 10, and by utilization of a switch 16 which provides isolation greater than the gain of RF amplifier 24.

The augmented signal retransmitted by device 10 is sampled at the rate $f_s$. However, the RF cycles contained within each increment of retransmitted signal 40 are coherent and therefore will be additive in a filter or a radar or other receiver. The output of such receiver will appear as though the signal were not sampled, but the received power will be one-half that of an input which is not sampled. Thus, when device 10 is used as a signal enhancer for radar signals, the improvement in magnitude of the radar echo will be equivalent to the gain of RF amplifier 24 minus 3 db. For example, if RF amplifier 24 exhibits a gain of 43 db, the retransmitted signal power will be 40 db greater than that of the signal received by antenna 12. Thus, the signal power returned to a radar receiver will be 10,000 times that of a signal reflected from a half wave length parasitic reflecting surface. This corresponds to increasing the maximum radar range by a factor of about 14.

Since the signal retransmitted by device 10 (FIG. 1) is identical in frequency and coherent in phase with the signal received by antenna 12, within the limits of frequency and sensitivity of RF amplifier 24, augmentation device 10 will produce a doppler signal when used with a doppler radar. Further, by modulating or turning on and off RF amplifier 24 in response to a digital pulse code supplied thereto, the signal retransmitted by device 10 may be pulse code modulated. Typically, the modulating pulses may have a duration ranging from 10 μsec to 10 msec, each pulse disabling operation of RF amplifier 24. The resultant pulse code modulation permits identification at the radar receiver of the particular target from which the augmented radar return is being received.

While the invention has been described with respect to a preferred physical embodiment constructed in accordance therewith, it will be apparent to those skilled in the art that various modifications and improvements may be made without departing from the scope and spirit of the invention.

I claim:

1. Apparatus for receiving a signal via an antenna, amplifying said signal, and concurrently retransmitting the amplified signal from the same antenna while retaining the relative amplitude, frequency, and phase characteristics of the received signal, said apparatus comprising:
    first means operatively coupled to said antenna for periodically sampling and amplifying said received signal;
    second means operatively coupled to said first means for delaying said sampled and amplified signal by an amount of time equal to one-half the reciprocal of the sampling rate; and
    third means operatively coupled to said second means for coupling to said antenna said delayed, sampled and amplified signal.

2. Apparatus as defined in claim 1 wherein said received signal is a *cw* or pulsed RF signal.

3. Apparatus as defined in claim 1 wherein said first means samples said received signal at a frequency substantially lower than that of said received signal.

4. Apparatus as defined in claim 1 wherein said first means comprises:
    an RF amplifier; and
    diode switch means for alternately isolating and passing said received signal to said amplifier.

5. Apparatus as defined in claim 4 wherein said diode switch means provides an isolation substantially greater than the gain of said amplifier.

6. Apparatus as defined in claim 4 wherein said diode switch means is controlled by a square wave signal of frequency $f_s$ substantially lower than the frequency of said received signal, and wherein said received signal is passed to said amplifier only when said square wave signal is true.

7. Apparatus as defined in claim 6 wherein said received signal is pulsed, and wherein said sample period is less than the pulse duration of said received signal.

8. Apparatus as defined in claim 4 further comprising a circulator cooperating with said antenna and wherein said second means comprises a delay line inserted between the output of said RF amplifier and said circulator.

9. Apparatus as defined in claim 8 wherein said delay line comprises a coaxial line exhibiting a delay time approximately equal to $\frac{1}{2}f_s$ where $f_s$ is the sampling rate.

10. An RF signal retransmission device comprising:
    an antenna,
    a circulator connected to said antenna,
    an RF amplifier,
    switch means for periodically, alternately isolating and passing a received RF signal from said circulator to the input of said RF amplifier, and
    a delay line connecting the output of said RF amplifier to said circulator, and providing a delay related to the periodicity of said switch means.

11. A retransmission device as defined in claim 10 wherein said switch means comprises a diode switch controlled by a periodic control signal of frequency $f_s$, the frequency of said received signal being at least $50f_s$.

12. A retransmission device as defined in claim 11 wherein said periodic control signal comprises a square wave, said RF signal being passed to said amplifier when said square wave is true, and wherein the delay time of said delay line is substantially equal to the time that said square wave is true during each period thereof.

13. A retransmission device as defined in claim 10 wherein said RF amplifier is broadband and provides an output signal of the same frequency and in phase coherence with the input thereto, said retransmission device thereby transmitting from said antenna an augmented signal identical in frequency and coherent in phase with the signal received by the same antenna.

14. A retransmission device as defined in claim 13 further comprising means for pulse code modulating the signal being amplified by said RF amplifier.

* * * * *